(12) United States Patent
Ma et al.

(10) Patent No.: US 11,938,623 B2
(45) Date of Patent: Mar. 26, 2024

(54) GROUND SIMULATION DEVICE AND METHOD FOR ON-ORBIT MANIPULATION OF SPACE MANIPULATOR

(71) Applicant: Shenzhen Technology University, Shenzhen (CN)

(72) Inventors: Gan Ma, Shenzhen (CN); Ziqi Xu, Shenzhen (CN); Zixin Lin, Shenzhen (CN); Zihao Jiao, Shenzhen (CN); Zhiming Chen, Shenzhen (CN); Wenwei Zhang, Shenzhen (CN)

(73) Assignee: Shenzhen Technology University, Shenzhen (CN)

( * ) Notice: Subject to any disclaimer, the term of this patent is extended or adjusted under 35 U.S.C. 154(b) by 0 days.

(21) Appl. No.: 18/177,777

(22) Filed: Mar. 3, 2023

(65) Prior Publication Data

US 2023/0278239 A1    Sep. 7, 2023

(30) Foreign Application Priority Data

Mar. 3, 2022    (CN) .......................... 202210209874.2

(51) Int. Cl.
| | |
|---|---|
| *B25J 19/00* | (2006.01) |
| *B25J 9/00* | (2006.01) |
| *B25J 9/16* | (2006.01) |
| *B64G 4/00* | (2006.01) |

(52) U.S. Cl.
CPC ......... *B25J 19/0095* (2013.01); *B25J 9/0087* (2013.01); *B25J 9/163* (2013.01); *B25J 9/1682* (2013.01); *B64G 2004/005* (2013.01)

(58) Field of Classification Search
CPC ...... B25J 19/0095; B25J 9/0087; B25J 9/163; G25J 9/1682; B64G 2004/005
See application file for complete search history.

(56) References Cited

U.S. PATENT DOCUMENTS 5,110,294 A * 5/1992 Brand ..................... B64G 7/00
434/34

FOREIGN PATENT DOCUMENTS

| CN | 104002301 A | * | 8/2014 | |
|---|---|---|---|---|
| CN | 104118580 A | | 10/2014 | |
| CN | 106081171 A | | 11/2016 | |
| CN | 108161990 A | * | 6/2018 | .......... B25J 19/0095 |

(Continued)

*Primary Examiner* — Octavia Davis Hollington
(74) *Attorney, Agent, or Firm* — Bayramoglu Law Offices LLC

(57) ABSTRACT

A ground simulation device and method for an on-orbit manipulation of a space manipulator is provided. The ground simulation device includes: a dual-arm robot, configured to simulate the space manipulator operating a target object; a suspension device, including a fixed post and passive rods, where the passive rods are movably connected with a top end of the fixed post, and the target object is suspended to the passive rods; and a simulation platform, configured to fix the dual-arm robot and the suspension device thereon. The ground simulation device provides the passive rods on the suspension device and suspends the target object to the passive rods, thus overcoming the gravity of the target object. In addition, the passive rods can drive the target object to move under an influence of an external force, achieving a similar suspension effect to that in space, and providing a desired, safe, and reliable implementation effect.

10 Claims, 3 Drawing Sheets

(56) References Cited

FOREIGN PATENT DOCUMENTS

| | | | | |
|---|---|---|---|---|
| CN | 108394572 B | * | 2/2019 | ............... B64G 7/00 |
| CN | 109500836 A | * | 3/2019 | .......... B25J 19/0095 |
| CN | 110282164 A | * | 9/2019 | ............... B64G 4/00 |
| CN | 113367720 A | | 9/2021 | |

* cited by examiner

GROUND SIMULATION DEVICE AND METHOD FOR ON-ORBIT MANIPULATION OF SPACE MANIPULATOR

CROSS REFERENCE TO THE RELATED APPLICATIONS

This application is based upon and claims priority to Chinese Patent Application No. 202210209874.2, filed on Mar. 3, 2022, the entire contents of which are incorporated herein by reference.

TECHNICAL FIELD

The present disclosure relates to the technical field of aerospace, and in particular to a ground simulation device and method for an on-orbit manipulation of a space manipulator.

BACKGROUND

With the maturity of robot technology, it is of great significance to use robots to replace astronauts for on-orbit manipulations and to perform complex on-orbit services. The existing robot planning and control theories and methods have become mature and widely used in the ground environment. The microgravity environment of the space station is different from the ground environment in terms of object state and dynamic characteristic. Therefore, it is necessary to establish ground simulation systems for space on-orbit manipulations, so as to verify the robot planning and control theories and methods in a simulated microgravity environment.

At present, the ground simulation systems for space on-orbit manipulations include a microgravity simulation system based on free falling motion, a microgravity simulation system based on parabolic flight, a neutral buoyancy experimental system, a suspension counterweight experimental system, and a flat air-bearing experimental system according to the microgravity simulation modes. These types of ground simulation systems only simply overcome the impact of gravity on objects on the ground, and are limited by short experimental time, low spatial dimension, and low dynamic performance, etc. Therefore, it is hard for them to make the object reach the same suspension state as in space, that is, they cannot achieve the purpose of fully simulating an on-orbit manipulation.

SUMMARY

A main objective of the present disclosure is to provide a ground simulation device and method for an on-orbit manipulation of a space manipulator, so as to solve the problem that the prior art cannot achieve object suspension and cannot achieve the purpose of fully simulating an on-orbit manipulation.

In order to achieve the above objective, a first aspect of the present disclosure provides a ground simulation device for an on-orbit manipulation of a space manipulator, including:
  a dual-arm robot, configured to simulate the space manipulator operating a target object;
  a suspension device, including a fixed post and passive rods, where the passive rods are movably connected with a top end of the fixed post, and the target object is suspended to the passive rods; and
  a simulation platform, configured to fix the dual-arm robot and the suspension device thereon.

Optionally, a rotating mechanism is provided between the fixed post and the passive rods.

Optionally, there are two passive rods with a same length, and a rotating mechanism is provided between the two passive rods.

Optionally, the rotating mechanisms each include two opposite bearings and a rotating shaft; the rotating shaft is provided between the two bearings; and an outer surface of the rotating shaft is provided with a plurality of annular rope grooves.

Optionally, the simulation platform includes two automated guided vehicles (AGVs), the AGVs being configured to fix the dual-arm robot and the suspension device, respectively.

Optionally, the fixed post is hollow inside, and is provided therein with four motors; the target object is provided with four suspension points coupled with the four motors, respectively; and suspension ropes are provided between the suspension points and the motors.

Optionally, the target object is provided thereon with an attitude sensor for acquiring acceleration data and attitude angle data of the target object.

Compared with the prior art, the present disclosure provides the passive rods on the suspension device and suspends the target object to the passive rods, thus overcoming the gravity of the target object. In addition, the passive rods can drive the target object to move under an influence of an external force, achieving a similar suspension effect to that in space, and providing a desired, safe, and reliable implementation effect.

A second aspect of the present disclosure provides a ground simulation method for an on-orbit manipulation of a space manipulator, including:
  suspending a target object, such that the target object is in a suspension state;
  acquiring attitude information of the target object in real time during a simulated on-orbit manipulation;
  acquiring, based on the attitude information, rotation speeds of motors according to a reinforcement learning model, where the motors are configured to control an attitude of the target object; and
  controlling, based on the rotation speeds, operation of the motors, to adjust the suspension state of the target object.

Optionally, the target object is suspended through four said motors, and the attitude information includes acceleration data and attitude angle data of the target object; and the acquiring, based on the attitude information, the rotation speeds of the motors according to the reinforcement learning model includes:
  inputting the acceleration data and the attitude angle data into the reinforcement learning model, and acquiring the rotation speeds of the four motors respectively according to a policy function in the reinforcement learning model.

Optionally, the ground simulation method further includes simulating the space manipulator with a dual-arm robot, and compensating a gravity of the dual-arm robot, the compensating the gravity of the dual-arm robot including:
  acquiring a gravity vector of a base of the dual-arm robot;
  acquiring a position vector of a centroid of each connecting rod relative to the base, where the connecting rod is configured to form the manipulator of the dual-arm robot;

acquiring a gravity compensation value of each connecting rod based on a mass of the connecting rod, the gravity vector, and the position vector;

accumulating all gravity compensation values to acquire a total gravity compensation value; and adjusting, based on the total gravity compensation value, an output torque of a motor for driving the manipulator of the dual-arm robot.

Compared with the prior art, the present disclosure suspends the target object to make the target object in a suspension state, acquires the attitude information of the target object in real time, and adjusts the rotation speeds of the motors through the reinforcement learning model to adjust the suspension state of the target object in real time, thus achieving a suspension effect as in space.

BRIEF DESCRIPTION OF THE DRAWINGS

To describe the technical solutions in the embodiments of the present disclosure or in the prior art more clearly, the drawings required for describing the embodiments or the prior art will be briefly described below. Apparently, the drawings in the following description show merely some embodiments of the present disclosure, and those of ordinary skill in the art may still derive other drawings from these drawings without creative efforts.

Figure 1:
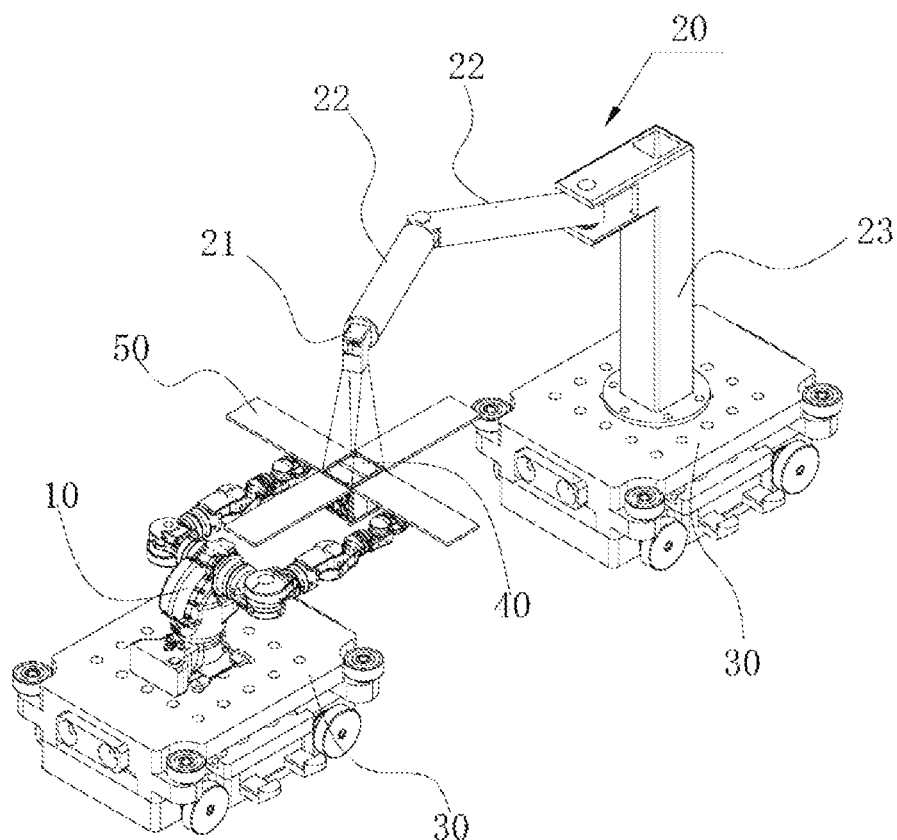
FIG. 1 is a schematic view of a ground simulation device for an on-orbit manipulation of a space manipulator according to an embodiment of the present disclosure.

REFERENCE NUMERALS 10. dual-arm robot; 20. suspension device; 21. outgoing mechanism; 22. passive rod; 23. fixed post; 24. bearing; 25. rotating shaft; 26. rope groove; 27. pulley; 30. AGV; 40. attitude sensor; and 50. simulation satellite.

DETAILED DESCRIPTION OF THE EMBODIMENTS

In the following description, specific details such as a specific system structure and a technology are provided for description instead of limitation, to thoroughly understand embodiments of the present disclosure. However, those skilled in the art should understand that the present disclosure may also be implemented in other embodiments without these specific details. In other cases, detailed descriptions of a well-known system, apparatus, circuit, and method are omitted to avoid unnecessary details interfering with the description of the present disclosure.

It should be understood that when used in this specification and the appended claims, the terms "comprise" and "include" indicate the presence of described features, integers, steps, operations, elements and/or components, but do not exclude the presence or addition of one or more of other features, integers, steps, operations, elements, components, and/or sets thereof.

It should be understood that the terms used in the specification of the present disclosure are for the purpose of describing specific embodiments only and are not intended to limit the present disclosure. As used in the specification of the present disclosure and the appended claims, the singular forms "a", "an" and "the" are intended to include the plural forms unless the context clearly indicates otherwise.

It should also be further understood that the term "and/or" as used in the specification of the present disclosure and the appended claims refers to one or any or all possible combinations of a plurality of associated items that are listed, and includes these combinations.

As used in this specification and the appended claims, the term "if" can be interpreted as "when" or "once" or "in response to a determination" or "in response to a detection" according to the context. Similarly, the phrase "if [the described condition or event] is determined" or "if [the described condition or event] is detected" can be interpreted as "once [the described condition or event] is determined" or "in response to the determination of [the described condition or event]" or "once [the described condition or event] is detected" or "in response to the detection of [the described condition or event]" according to the context.

The technical solutions of the embodiments of the present disclosure are clearly and completely described below with reference to the drawings. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure.

Many specific details are set forth in the following description to facilitate full understanding of the present disclosure, but the present disclosure may also be implemented in other ways different from those described herein, similar derivatives may be made by those skilled in the art without departing from the connotation of the present disclosure, and therefore, the present disclosure is not limited by the specific implementations disclosed below.

With the maturity of robot technology, it is of great significance to use robots to replace astronauts for on-orbit manipulations and perform complex on-orbit services. The existing robot planning and control theories and methods have become mature and widely used in the ground environment. The microgravity environment of the space station is different from the ground environment in terms of object state and dynamic characteristic. Therefore, it is necessary to establish ground simulation systems for space on-orbit manipulations so as to verify the robot planning and control theories and methods in a simulated microgravity environment.

At present, the ground simulation systems used for space on-orbit manipulations include a microgravity simulation system based on free falling motion, a microgravity simulation system based on parabolic flight, a neutral buoyancy experimental system, a suspension counterweight experimental system, and a flat air-bearing experimental system according to the microgravity simulation modes.

The microgravity simulation system based on free falling motion and the microgravity simulation system based on parabolic flight have problems that the experimental time is short and the size of the experimental product is limited by the simulation system.

The prototype of the space robot in the neutral buoyancy experimental system cannot be directly used for testing on the neutral buoyancy system. It needs to be specially designed to avoid the impact of the underwater environment. In addition, the resistance and inertia of water will change the dynamic characteristic of the space robot.

The suspension counterweight experimental system has low gravity compensation accuracy, and it is hard to identify the dynamic friction of the suspension system and accurately compensate it in the control system. In addition, the coupling vibration between the space robot and the suspension system is likely to make the whole system unstable.

The flat air-bearing experimental system can achieve translation in X and Y directions with a small disturbing force, but it can only support the movement of 2 degrees of freedom (DOF) or 3DOF of the space manipulator, and cannot achieve the coupling movement of all DOFs at the same time.

These types of ground simulation systems only simply overcome the impact of gravity on objects on the ground, and can hardly make the object reach the same suspension state as in space, that is, they cannot achieve the purpose of fully simulating the on-orbit manipulation.

In a simulation device of the present disclosure, a passive rod is provided on a suspension device to suspend a target object, thus overcoming the gravity of the target object. In addition, the passive rods can drive the target object to move under the influence of an external force to achieve the same suspension effect as in space.

Exemplary device

As shown in FIG. 1, this embodiment provides a ground simulation device for an on-orbit manipulation of a space manipulator, which simulates a scene of a manipulator operating a satellite in space. Specifically, the ground simulation device mainly includes a dual-arm robot 10 and a suspension device 20. The dual-arm robot 10 simulates a space manipulator to operate a simulation satellite 50. The suspension device 20 is configured to suspend the simulation satellite 50. In this embodiment, the suspension device 20 mainly includes a fixed post 23 and passive rods 22. The simulation satellite 50 is suspended to a front end of the passive rods 22, and the passive rods 22 are movably connected with a top end of the fixed post 23. The passive rods 22 are not controlled by an active driving force, but by a passive driving force such as an interaction force. During a simulated on-orbit manipulation, the simulation satellite 50 moves, pushing the passive rod 22 to move accordingly, thus simulating the movement of an object in space due to an external force. Since no motor is needed to control the passive rods 22, the cost and control difficulty of the simulation device are reduced. It should be noted that the shape and size of the passive rods 22 are not specifically limited.

Figure 2:
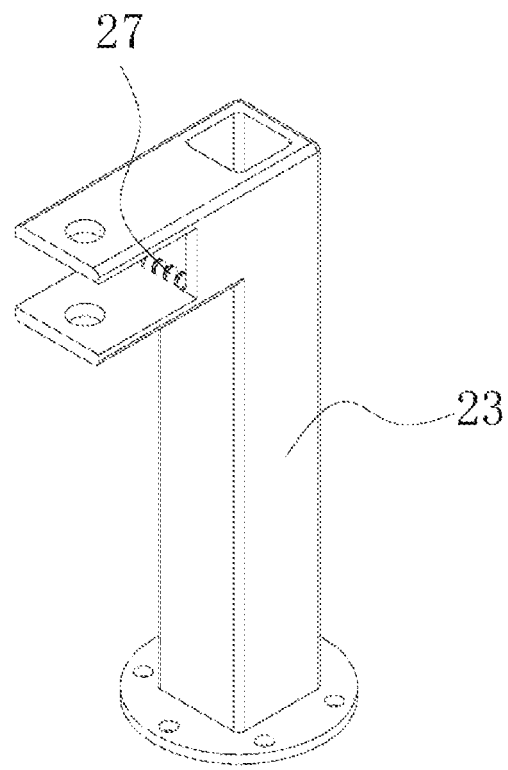
FIG. 2 is a schematic view of a fixed post shown in FIG. 1.

In order to achieve greater moment of suspension and make the suspension device 20 more stable, as shown in FIG. 2, the fixed post 23 is a hollow L-shaped post, and the passive rods 22 are hollow inside. In this way, motors (not shown in the figure) are arranged in the fixed post 23. Rope reels are fixed to the motors, respectively. Suspension ropes are wound on the rope reels, respectively, and they pass through the fixed post 23 and the passive rods 22 to suspend the simulation satellite 50. With the structure, a centroid of the suspension device 20 is located at a rear end of the suspension device 20, thus enhancing stability, reducing the moment of inertia, and enhancing the dynamic motion effect.

Optionally, the motors may be high-torque direct-drive motors, which have high pulling torques.

Figure 3:
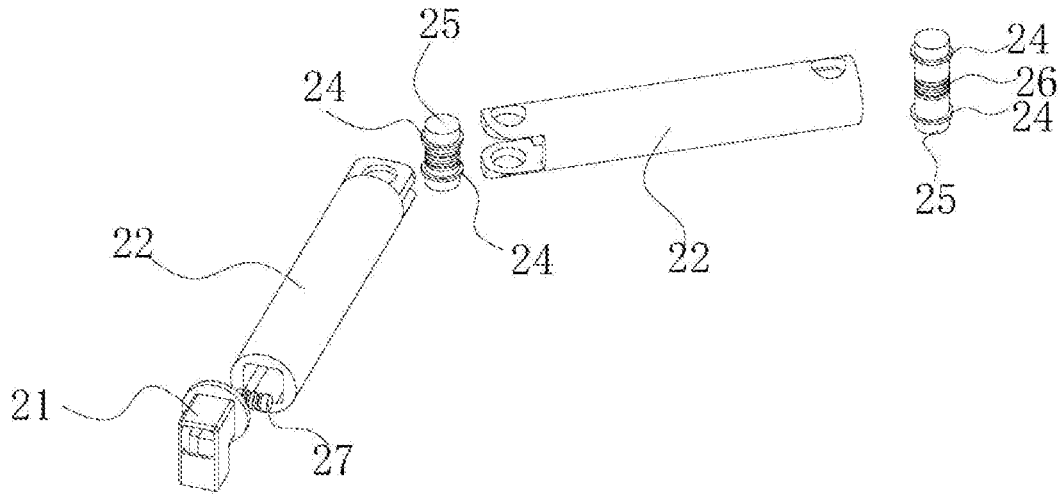
FIG. 3 is an exploded view of a connection structure of passive rods shown in FIG. 1.

Further, in order to achieve a better suspension effect of the simulation satellite 50, as shown in FIG. 3, the passive rods 22 are 3DOF passive rods, and there are two passive rods 22 with a same length. The two passive rods 22 are connected. By taking a sum of the lengths of the two passive rods 22 as a radius and taking the L-shaped post as an origin, a fan-shaped working plane is formed. The simulation satellite 50 can reach any point in the working plane without a dead point and has higher flexibility. The object in space is in a suspension state and the attitude of the object is not fixed. Therefore, the 3DOF passive rods 22 can imitate the microgravity environment in space as much as possible.

Further, the simulation satellite 50 is provided with four suspension points. Four suspension ropes are connected with the four suspension points, respectively. Correspondingly, four brushless motors are fixed in the fixed post 23. Each suspension rope is wound on the rope reel of the brushless motor. The suspension points of the simulation satellite 50 are controlled by the different motors to achieve the 3DOF control effect of the simulation satellite 50. The simulation satellite 50 is suspended, overcoming the gravity on the ground, and can move up and down along a Z axis. In addition, an up-down position of each suspension point of the simulation satellite 50 can be controlled to adjust a deflection angle of the simulation satellite 50 relative to XY axes, so as to better realize the suspension of the simulation satellite 50. That is, through the coordinated control of the four brushless motors on the suspension ropes, the attitude of the simulation satellite 50 can be changed to achieve the suspension state as in space.

Further, the brushless motors are motors with a low reduction ratio, and the rotation speeds of the motors can be changed according to angle changes of the suspension ropes.

In this embodiment, the passive rod 22 and the fixed post 23 are connected by a rotating mechanism, and the two passive rods 22 are also connected by a rotating mechanism, so as to reduce friction. Specifically, the rotating mechanism includes two opposite bearings 24 and a rotating shaft 25. The two bearings 24 are fixed to the rotating shaft 25 at intervals. During a simulated on-orbit manipulation, when the simulation satellite 50 moves, it is easy to push the passive rod 22 to move accordingly, thus simulating the movement of an object in space due to an external force.

In order to prevent interference between the suspension ropes, in this embodiment, the front end of the passive rod 22 is provided with an outgoing mechanism 21. The outgoing mechanism 21 is connected with a free end of the passive rod 22. The outgoing mechanism 21 is provided with a pulley 27 for changing directions of the suspension ropes. The outgoing mechanism 21 serves as an outlet of the suspension ropes, and the suspension ropes pass through the outgoing mechanism 21 to suspend the simulation satellite 50. A pulley 27 for changing the directions of the suspension ropes is further provided at a turning point of the fixed post 23. The rotating shaft includes a rotating shaft 25 between the passive rod 22 and a rotating shaft 25 between the passive rod 22 and the fixed post 23. An outer surface of each rotating shaft 25 is provided with a plurality of annular rope grooves 26. Of course, the pulley 27 can prevent interference between the suspension ropes and reduce friction between the suspension ropes and other objects.

In the present disclosure, the simulation device is further provided with a simulation platform. The dual-arm robot 10 and the suspension device 20 are fixed on the simulation platform. Specifically, a manipulator and a target satellite rotate around the earth in a space environment during an on-orbit manipulation. Therefore, when the on-orbit environment is simulated, the rotation of the target satellite around the earth in space can be approximately considered as linear motion. Considering this, in this embodiment, the simulation platform includes two AGVs 30 which are configured to fix the dual-arm robot 10 and the suspension device 20, respectively. The two AGVs 30 move in a same direction at a same speed. When the two AGVs 30 move, a distance between the dual-arm robot 10 and the simulation satellite 50 does not change, but the position of the simulation satellite 50 changes accordingly to achieve the simulation of the on-orbit environment. Moreover, by fixing the dual-arm robot 10 and the suspension device 20 to the mobile AGVs 30, it is convenient to change the simulation site, and the simulation device can be quickly deployed to a new simulation site without additional handling equipment. The motion space of the simulation satellite 50 and the working space of the dual-arm robot 10 are not limited. in fact, they are theoretically infinite.

Further, in this embodiment, the simulation satellite 50 is provided thereon with an attitude sensor 40 for acquiring acceleration data, attitude angle data and other attitude information of the simulation satellite. Specifically, the attitude sensor 40 is an inertial measurement unit (IMU). The attitude sensor 40 is provided at a midpoint of an upper surface of the simulation satellite 50 and is realized by means of 5 V power supply and RS232 communication. The attitude sensor 40 transmits the acquired attitude information to a processing terminal. The processing terminal processes the attitude information and coordinates the motors in the fixed post 23 to make the simulation satellite 50 in a full suspension state. The processing terminal can be a commonly used electronic terminal, such as a computer or a notebook, which is not limited herein.

The present disclosure innovatively designs the passive rods to enable the simulation satellite to move in the direction of an external force. The present disclosure suspends the simulation satellite through a simple structure combining the motors and suspension ropes, which is simple in control and low in cost. The present disclosure realizes the suspension device with 7DOF (formed by four active joints and three passive joints). The suspension device combining the active and passive control features a small moment of inertia and desired dynamic effect, which makes it easier to achieve the effect of operating a suspension satellite with a manipulator on the ground.

Exemplary method

Figure 4:
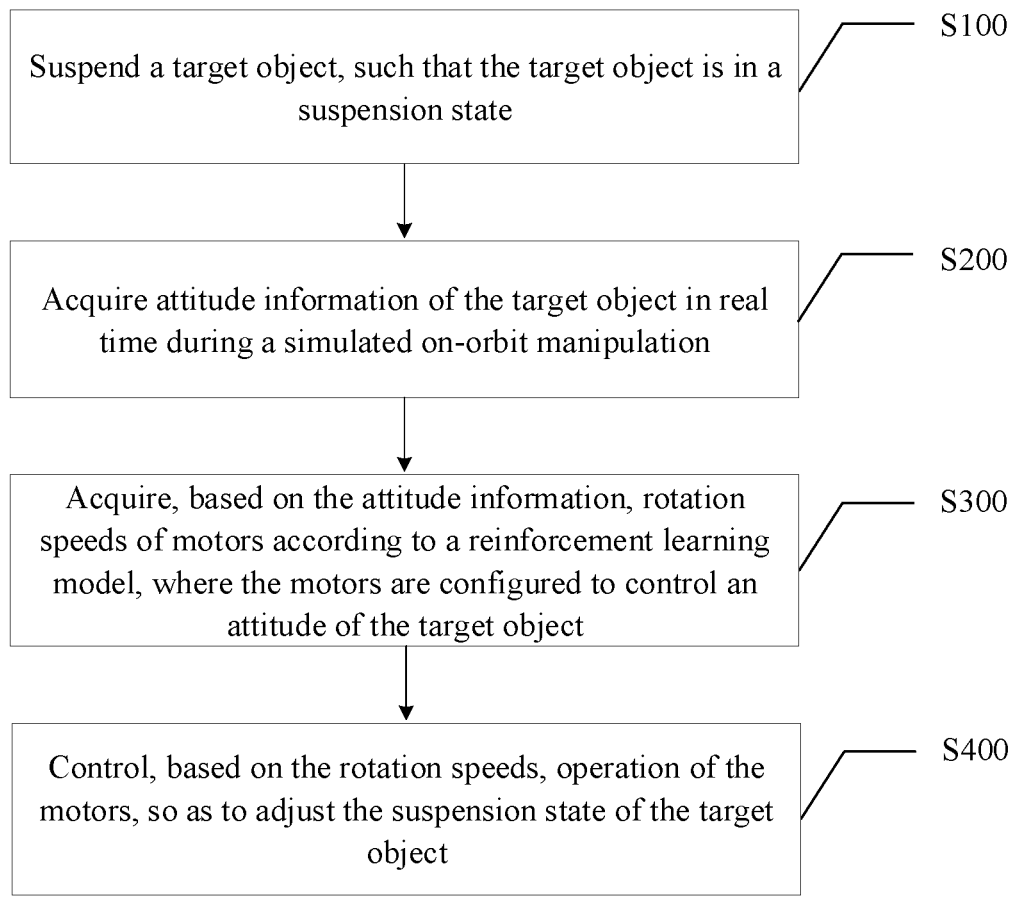
FIG. 4 is a flowchart of a ground simulation method for an on-orbit manipulation of a space manipulator according to an embodiment of the present disclosure.

In order to simulate the suspension effect of the simulation satellite during the on-orbit manipulation, as shown in FIG. 4, this embodiment further provides a ground simulation method for an on-orbit manipulation of a space manipulator. Specifically, the ground simulation method includes the following steps.

S100. A target object is suspended, such that the target object is in a suspension state.

In the suspension state, the target object overcomes the gravity on the ground, and when the manipulator operates the target object, the target object can move and deflect due to the force of the manipulator. In other words, as in space, the target object changes its attitude due to the external force.

Specifically, the target object can be suspended by motors and suspension ropes, and when the target object is subject to the force of the manipulator, the attitude of the target object can be changed to achieve the suspension effect. For example, a movable rod can be provided at a front end of a suspension device for suspending the target object. Under the force of the manipulator, the movable rod can move, such that the target object can move. The movable rod can be driven by an electric motor. Preferably, like the ground simulation device, the ground simulation method uses a passive rod, which can reduce the use of motors. The structure is simple and does not require active control.

S200. Attitude information of the target object is acquired in real time when the on-orbit manipulation is simulated.

Specifically, in this embodiment, in order to further control the attitude of the target object to better achieve the space suspension effect, the target object is provided thereon with an attitude sensor for acquiring acceleration data, attitude angle data and other attitude information of the target object so as to further adjust the attitude of the target object. In this embodiment, the target object is a simulation satellite and the attitude sensor is an IMU. The IMU is provided at a midpoint of an upper surface of the simulation satellite, powered by 5 V, and communicates with a computer terminal through RS232 to transmit the acquired attitude information to the computer terminal.

S300: Based on the attitude information, rotations speed of motors is acquired according to a reinforcement learning model, where the motors are configured to control the attitude of the target object.

S400: Based on the rotation speeds, the operation of the motors is controlled to adjust the suspension state of the target object.

Specifically, after the attitude information is acquired, the attitude information is transmitted to the processing terminal. The reinforcement learning model is run on the processing terminal to acquire the rotation speeds of the motors. Then, the operation of the motors is controlled to adjust tension of suspension points on the target objects, so as to change the attitude of the target object, that is, to further adjust the suspension state of the target object.

In this embodiment, the reinforcement learning model is trained in advance, and a reward function is configured to optimize a policy function for optimizing and controlling the motors. A specific training method is as follows. Since the target object is suspended through four motors, the following data included in the attitude information, namely the acceleration data and attitude angle data of the target object, and the rotation speeds of the four motors, are input into the reward function in the reinforcement learning model. According to the policy function in the reinforcement learning model, a next motor action is output. The action is scored through the reward function. The policy function is updated by a gradient descent to realize the optimization of the policy function. After the training of the reinforcement learning model is completed, the following data included in the attitude information, namely the acceleration data and attitude angle data of the target object, are input into the reinforcement learning model. The rotation speeds of the four motors are output through the policy function to realize the adjustment of the target object.

Specifically, the ground simulation method can adjust a height of the target object, and can also adjust a pitch angle and a roll angle of the target object (collectively referred to as a yaw angle).

Specifically, the reward function of the reinforcement learning model is:

$$r = k_1 \frac{|v_1| + |v_2| + |v_3| + |v_4|}{4} - k_2 \Delta a_z - k_3 \Delta \text{pitch} - k_4 \Delta \text{roll}$$

where, $v_1$, $v_2$, $v_3$, and $v_4$ denote the speeds of the motors, respectively; $\Delta a_z$ denotes an error between a vertical acceleration of the target object and a target vertical acceleration after am action of the motor; $\Delta$pitch denotes an error between the pitch angle of the target object and a target pitch angle after the action of the motor; $\Delta$roll denotes an error between the roll angle of the target object and a target roll angle after the action of the motor; and $k_1$, $k_2$, $k_3$, and $k_4$ denote hyper-parameters to be adjusted.

The policy function of the reinforcement learning model is:

$$\pi(a|s) = \prod_{i=1}^{4} \frac{1}{\sqrt{6.28}\,\sigma_i} \cdot \exp\left(-\frac{(a_i - \mu_i)^2}{2\sigma_i^2}\right)$$

The policy function $\pi(a|s)$ is a multivariate normal distribution function, where a denotes the action; s denotes an observed state, referred to the acceleration data and attitude angle data of the target object included in the attitude information; $a_i$ denotes an action of an i-th motor output; $\mu_i$ denotes a mean value of an i-th element; and $\sigma_i$ denotes a variance of the i-th element.

In this example, a microgravity model of the simulation satellite is constructed by strengthening the training of a few parameters of the manipulator operation through the identification of the parameters of the simulation satellite so as to achieve the suspension effect of the simulation satellite on the ground.

Figure 5:
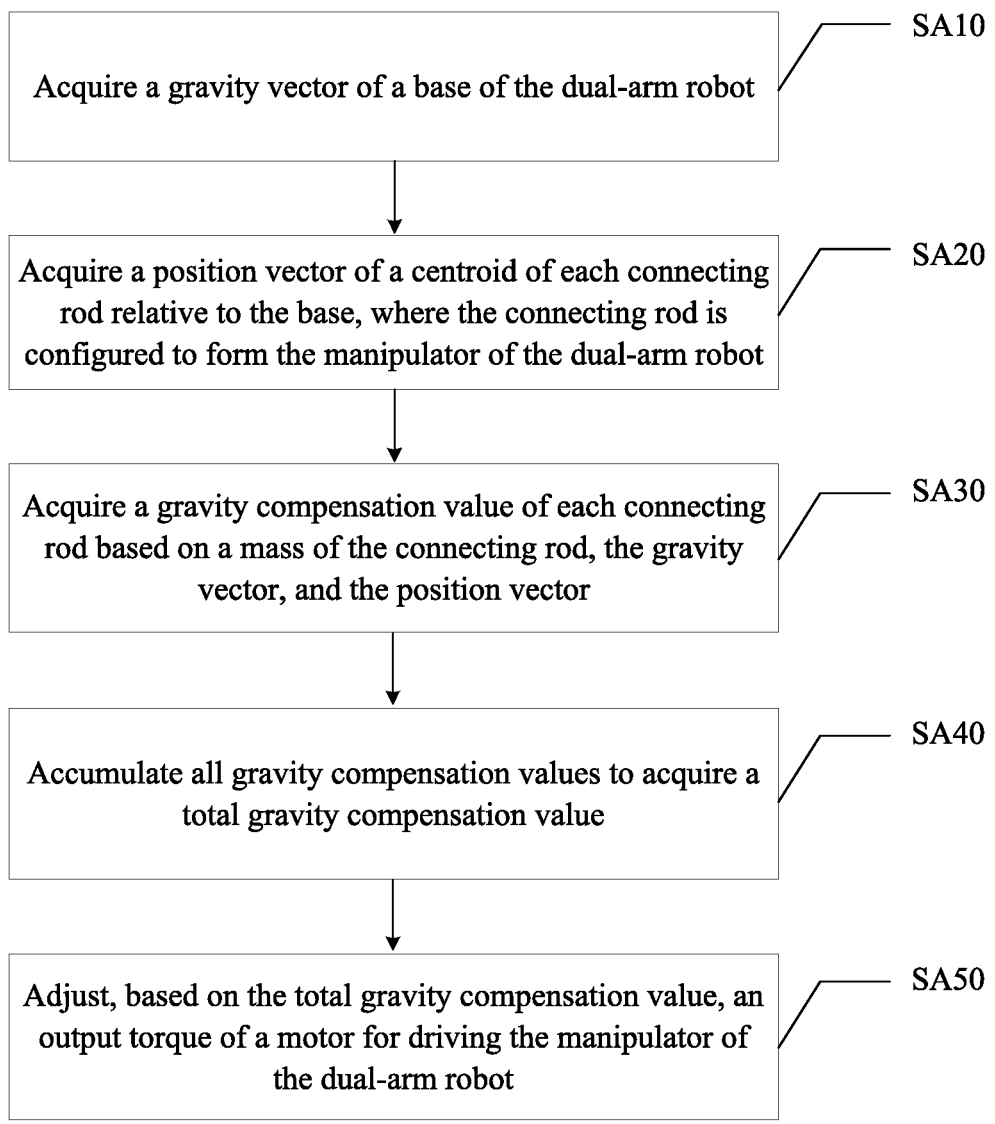
FIG. 5 is a flowchart of gravity compensation for a dual-arm robot according to an embodiment of the present disclosure.

Further, in this embodiment, a dual-arm robot simulates the space manipulator, and the gravity of the dual-arm robot is compensated. As shown in FIG. 5, the gravity compensation includes:

SA10. A gravity vector of a base of the dual-arm robot is acquired.

SA20. A position vector of a centroid of each connecting rod relative to the base is acquired, where the connecting rod is configured to form the manipulator of the dual-arm robot.

Specifically, the gravity vector refers to three components of the gravity disturbance and disturbing gravity. The gravity vector can be acquired by measurement. For example, by taking a measured vertical deviation and a measured vertical gravity as observation values, an accurate relationship model of vertical gravity value, vertical deviation and horizontal gravity component is established. Using this relationship model as an observation equation, a horizontal component of the gravity vector with high accuracy is acquired through a Kalman filter estimation. Specifically, the disturbing gravity vector can be estimated by a direct difference referring to the existing ship's inertial navigation system (SINS), which will not be repeated herein. The position vector refers to one of a particle in a selected coordinate system in a reference system. It is a directed line segment from an origin of the coordinate system to a location of the particle. In this embodiment, the position vector is a directed line segment from the origin of the coordinate system to the centroid of each connecting rod.

SA30. A gravity compensation value of each connecting rod is acquired based on a mass of the connecting rod, the gravity vector, and the position vector.

SA40. All gravity compensation values are accumulated to obtain a total gravity compensation value.

SA50. Based on the total gravity compensation value, an output torque of a motor for driving the manipulator of the dual-arm robot is adjusted.

Specifically, the gravity compensation is expressed as follows:

$$M_{gc} = \sum_{1}^{n} \{^b r_i\} \times \{^b g\}(m_i)$$

where, $m_i$ denotes the mass of an i-th connecting rod; $^b g$ denotes the gravity vector of the base of the dual-arm robot; $^b r_i$ denotes the position vector of the centroid of the i-th connecting rod relative to the base of the dual-arm robot; and $M_{gc}$ denotes the total gravity compensation value.

After the total gravity compensation value is acquired, the total gravity compensation value is added to the output torque of the motor for driving the manipulator of the dual-arm robot. In this way, the gravity of the manipulator is compensated, and the dual-arm robot can reach a suspension state as in space.

In this embodiment, the gravity compensation algorithm is configured to compensate the gravity of the manipulator when the dual-arm robot is moving. That is, the gravity of the dynamic motion of the manipulator that needs to be overcome is added to the output torque of the motor of the manipulator so as to realize the gravity compensation, such that the manipulator of the dual-arm robot can reach a suspension state as in space.

Further, during the on-orbit manipulation, the manipulator and the target satellite rotate around the earth in the space environment. Therefore, the present disclosure further simulates the on-orbit environment by controlling the dual-arm robot and the suspension device to perform synchronous movement in the same direction. Specifically, the rotation of the target satellite around the earth in space can be approximately considered as linear motion. Considering this, in this embodiment, the simulation platform includes two AGVs which are configured to fix the dual-arm robot and the suspension device, respectively. The two AGVs are controlled to move in a same direction at a same speed. When the two AGVs move, a distance between the dual-arm robot and the target object does not change, but the position of the simulation satellite changes accordingly to achieve the simulation of the on-orbit environment.

It should be understood that the serial number of each step in the above embodiment does not indicate the order of performing the process. The order of performing each process is determined by its function and internal logic, and should not limit the implementation of the embodiments of the present disclosure.

Those skilled in the art should clearly understand that, for convenient and concise description, only the division of the above-mentioned functional units/modules is used as an example for illustration. In practical application, the above-mentioned functions may be realized by different functional units/modules as required, that is, the internal structure of the apparatus is divided into different functional units or modules to complete all or part of the above-described functions. The functional units/modules in the embodiments may be integrated into one processing unit, or each of the units may exist alone physically, or two or more units are integrated into one unit. The above integrated unit may be implemented either in a form of hardware or in a form of a software functional unit. In addition, specific names of the functional units/modules are only for the convenience of distinguishing each other, and are not intended to limit the protection scope of the present disclosure. For specific working processes of the units/modules in the above system, reference may be made to the corresponding processes in the above method embodiment, and details are not described herein again.

In the above embodiments, the description of the embodiments each has a focus, and portions not described or recorded in detail in one embodiment may refer to the description of other embodiments.

Those of ordinary skill in the art may be aware that units and algorithm steps in examples described with reference to the embodiments disclosed in this specification can be implemented by electronic hardware or a combination of computer software and electronic hardware. Whether these functions are implemented by hardware or software depends on specific applications of the technical solutions and design constraints. A person skilled in the art may use different methods to implement the described functions for each specific application, but such implementation should not be considered to be beyond the scope of the present disclosure.

It should be understood that the device/terminal and method disclosed by the embodiments of the present disclosure may be implemented in other manners. For example, the described examples of the devices/terminal devices are merely provided schematically. For example, the division of modules or units merely refers to logical function division, and there may be other division manners in actual implementation. For example, a plurality of units or components may be combined or integrated into another system, or some features may be ignored or not executed.

The foregoing embodiments are only used to explain the technical solutions of the present disclosure, and are not intended to limit the present disclosure. Although the present disclosure is described in detail with reference to the foregoing embodiments, persons of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions in the embodiments of the present disclosure, and shall fall within the protection scope of the present disclosure.

What is claimed is:

1. A ground simulation device for an on-orbit manipulation of a space manipulator, comprising:
a dual-arm robot, configured to simulate the space manipulator operating a target object;
a suspension device, comprising a fixed post and passive rods, wherein the passive rods are movably connected with a top end of the fixed post, and the target object is suspended to the passive rods; and
a simulation platform, configured to fix the dual-arm robot and the suspension device thereon;
wherein the fixed post is hollow inside, and the fixed post is provided therein with four motors; the target object is provided with four suspension points coupled with the four motors, respectively; suspension ropes are provided between the suspension points and the motors; and
the motors are configured to control the suspension ropes to adjust an up-down position of the target object, and control up-down positions of the suspension points to adjust a deflection angle of the target object relative to XY axes;

the simulation platform comprises two automated guided vehicles (AGVs), wherein the AGVs are configured to fix the dual-arm robot and the suspension device, respectively; and
a manipulator of the dual-arm robot comprises a connecting rod, and the manipulator of the dual-arm robot is further provided with a motor for driving the manipulator; and the dual-arm robot is further configured to adjust an output torque of the motor according to a mass of the connecting rod, a gravity vector of a base of the dual-arm robot, and a position vector of a centroid of the connecting rod relative to the base of the dual-arm robot, to compensate a gravity of the manipulator,
wherein the simulation platform is further configured to simulate the space manipulator with the dual-arm robot, and compensate the gravity of the manipulator of the dual-arm robot, the compensating of the gravity comprising:
accumulating all gravity compensation values to acquire a total gravity compensation value; and
adjusting, based on the total gravity compensation value, the output torque of the motor for driving the manipulator of the dual-arm robot;
wherein the total gravity compensation value acquired by the acquiring the gravity compensation value of each connecting rod based on the mass of the connecting rod, the gravity vector, and the position vector, and the accumulating all the gravity compensation values is expressed as follows:
$M_{gc} = \Sigma_1^n \{^b r^i\} \times \{^b g\}(m_i)$, wherein, $m_i$ denotes a mass of an i-th connecting rod; $^b g$ denotes the gravity vector of the base of the dual-arm robot $^b r_i$ denotes a position vector of a centroid of the i-th connecting rod relative to the base of the dual-arm robot; and $M_{gc}$ denotes the total gravity compensation value.

2. The ground simulation device for the on-orbit manipulation of the space manipulator according to claim 1, wherein a rotating mechanism is provided between the fixed post and the passive rods.

3. The ground simulation device for the on-orbit manipulation of the space manipulator according to claim 2, wherein two passive rods with a same length are arranged, and a rotating mechanism is provided between the two passive rods.

4. The ground simulation device for the on-orbit manipulation of the space manipulator according to claim 3, wherein the rotating mechanism comprises two opposite bearings and a rotating shaft; the rotating shaft is provided between the two opposite bearings; and an outer surface of the rotating shaft is provided with a plurality of annular rope grooves.

5. The ground simulation device for the on-orbit manipulation of the space manipulator according to claim 2, wherein the rotating mechanism comprises two opposite bearings and a rotating shaft; the rotating shaft is provided between the two opposite bearings; and an outer surface of the rotating shaft is provided with a plurality of annular rope grooves.

6. The ground simulation device for the on-orbit manipulation of the space manipulator according to claim 1, wherein the target object is provided thereon with an attitude sensor for acquiring acceleration data and attitude angle data of the target object.

7. The ground simulation device for the on-orbit manipulation of the space manipulator according to claim 1, wherein the accumulating all the gravity compensation values comprises acquiring the gravity vector of the base of the dual-arm robot; and acquiring the position vector of a centroid of each connecting rod relative to the base, wherein the connecting rod is configured to form the manipulator of the dual-arm robot.

8. The ground simulation device for the on-orbit manipulation of the space manipulator according to claim 1, wherein the simulation platform is further configured to:

acquire attitude information of the target object in real time during a simulated on-orbit manipulation;

acquire, based on the attitude information, rotation speeds of the motors according to a reinforcement learning model, wherein the motors are further configured to control an attitude of the target object;

wherein the attitude information comprises acceleration data and attitude angle data of the target object; and the acquiring, based on the attitude information, the rotation speeds of the motors according to the reinforcement learning model comprises:

inputting the acceleration data and the attitude angle data into the reinforcement learning model, and acquiring the rotation speeds of the four motors respectively according to a policy function in the reinforcement learning model.

9. A ground simulation method for an on-orbit manipulation of a space manipulator, wherein the ground simulation method comprises:

suspending a target object, such that the target object is in a suspension state;

acquiring attitude information of the target object in real time during a simulated on-orbit manipulation;

acquiring, based on the attitude information, rotation speeds of motors according to a reinforcement learning model, wherein the motors are configured to control an attitude of the target object; and controlling, based on the rotation speeds, operation of the motors, to adjust the suspension state of the target object;

controlling the attitude of the target object by the motors, comprising:

suspending the target object through four said motors, and controlling an up-down position of each suspension point to adjust a deflection angle of the target object relative to XY axes; and the ground simulation method further comprises: simulating the space manipulator with a dual-arm robot, and compensating a gravity of a manipulator of the dual-arm robot, the compensating the gravity comprising:

acquiring a gravity vector of a base of the dual-arm robot; acquiring a position vector of a centroid of each connecting rod relative to the base, wherein the connecting rod is configured to form the manipulator of the dual-arm robot; acquiring a gravity compensation value of each connecting rod based on a mass of the connecting rod, the gravity vector, and the position vector; accumulating all gravity compensation values to acquire a total gravity compensation value; and adjusting, based on the total gravity compensation value, an output torque of a motor for driving the manipulator of the dual-arm robot;

wherein the total gravity compensation value acquired by the acquiring the gravity compensation value of each connecting rod based on the mass of the connecting rod, the gravity vector, and the position vector, and the accumulating all the gravity compensation values is expressed as follows:

$M_{gc} = \Sigma_1^n \{^b r_i\} \times \{^b g\}(m_i)$, wherein, m denotes a mass of an i-th connecting rod; $^b g$ denotes the gravity vector of the base of the dual-arm robot; $^b r_i$ denotes a position vector of a centroid of the i-th connecting rod relative to the base of the dual-arm robot; and $M_{gc}$ denotes the total gravity compensation value.

10. The ground simulation method for the on-orbit manipulation of the space manipulator according to claim 6, wherein the attitude information comprises acceleration data and attitude angle data of the target object; and the acquiring, based on the attitude information, the rotation speeds of the motors according to the reinforcement learning model comprises:

inputting the acceleration data and the attitude angle data into the reinforcement learning model, and acquiring the rotation speeds of the four motors respectively according to a policy function in the reinforcement learning model.

* * * * *